(12) United States Patent
Curtis

(10) Patent No.: US 8,073,285 B2
(45) Date of Patent: Dec. 6, 2011

(54) USER INTERFACE METHODS AND SYSTEMS FOR IMAGE BRIGHTNESS AND CONTRAST

(75) Inventor: Donald B. Curtis, Highland, UT (US)

(73) Assignee: Ancestry.com Operations Inc., Provo, UT (US)

(*) Notice: Subject to any disclaimer, the term of this patent is extended or adjusted under 35 U.S.C. 154(b) by 1046 days.

(21) Appl. No.: 11/845,635

(22) Filed: Aug. 27, 2007

(65) Prior Publication Data

US 2009/0060378 A1    Mar. 5, 2009

(51) Int. Cl.
G06K 9/40 (2006.01)
G06F 3/048 (2006.01)

(52) U.S. Cl. .................. 382/274; 382/254; 715/833

(58) Field of Classification Search .............. 382/274
See application file for complete search history.

(56) References Cited

U.S. PATENT DOCUMENTS

| | | | | |
|---|---|---|---|---|
| 5,854,851 A * | 12/1998 | Bamberger et al. | ........... | 382/132 |
| 6,075,903 A * | 6/2000 | Breiter et al. | ........... | 382/261 |
| 6,239,782 B1 * | 5/2001 | Siegel | ........... | 345/690 |
| 6,760,485 B1 * | 7/2004 | Gilman et al. | ........... | 382/274 |
| 6,778,691 B1 * | 8/2004 | Barski et al. | ........... | 382/132 |
| 7,184,056 B2 * | 2/2007 | Brody et al. | ........... | 345/594 |
| 7,215,813 B2 * | 5/2007 | Graves et al. | ........... | 382/167 |
| 7,336,277 B1 * | 2/2008 | Clark et al. | ........... | 345/426 |
| 7,423,696 B2 * | 9/2008 | Samadani et al. | ........... | 348/645 |
| 7,444,038 B2 * | 10/2008 | Shimizu et al. | ........... | 382/311 |
| 7,483,083 B2 * | 1/2009 | Li et al. | ........... | 348/673 |
| 7,486,299 B2 * | 2/2009 | Debevec et al. | ........... | 345/589 |
| 7,495,679 B2 * | 2/2009 | Chou | ........... | 345/690 |
| 7,535,482 B2 * | 5/2009 | Lee et al. | ........... | 345/690 |
| 7,576,750 B2 * | 8/2009 | Eckhardt et al. | ........... | 345/601 |
| 7,693,341 B2 * | 4/2010 | Pettigrew et al. | ........... | 382/254 |
| 7,715,649 B2 * | 5/2010 | Kameyama | ........... | 382/274 |
| 2003/0012437 A1 * | 1/2003 | Zaklika et al. | ........... | 382/169 |
| 2003/0161546 A1 * | 8/2003 | Sobol et al. | ........... | 382/274 |
| 2007/0036456 A1 | 2/2007 | Hooper | | |
| 2007/0104389 A1 * | 5/2007 | Wells | ........... | 382/274 |
| 2007/0133871 A1 | 6/2007 | Yoshiura | | |
| 2007/0247679 A1 * | 10/2007 | Pettigrew et al. | ........... | 358/518 |

* cited by examiner

*Primary Examiner* — Vikkram Bali
*Assistant Examiner* — Michelle Entezari
(74) *Attorney, Agent, or Firm* — Kilpatrick Townsend & Stockton LLP

(57) ABSTRACT

An image editing user interface includes a first control adapted to alter an image property of an image in response to a user input and a second control adapted to operate in cooperation with the first control to alter the image property in response to a user input. The image property is brightness and the first control alters brightness over a range of image values between two endpoints and the second control defines at least one of the endpoints.

18 Claims, 10 Drawing Sheets

USER INTERFACE METHODS AND SYSTEMS FOR IMAGE BRIGHTNESS AND CONTRAST

FIELD OF THE INVENTION

Embodiments of the present invention relate generally to image editing systems and methods. More specifically, embodiments of the invention relate to systems and methods for adjusting image brightness and/or contrast and associated user interfaces.

BACKGROUND OF THE INVENTION

Electronic images—in particular images that result from scanning operations—often require some degree of editing to become usable. Brightness and contrast are two image characteristics that frequently require editing. A brightness adjustment typically involves adding or subtracting a value to all image values, the added or subtracted value being determined by the brightness setting. This has the effect of creating distortion in the image lowlights or highlights, depending on the displacement of the brightness setting. Similarly, a contrast adjustment typically increases or decreases the variation between image values over some range of image values. This also has the effect of creating distortion throughout parts of the image.

Complex editing programs exist that allow users greater control over brightness and/or contrast adjustment, but such editing programs require much greater user skill and are time consuming to work with. Hence, they are not suitable for production environments, which require the balancing of user control with production efficiency. Improved systems and methods are, therefore, needed.

BRIEF SUMMARY OF THE INVENTION

Embodiments of the present invention provide an image editing user interface. The interface includes a first control adapted to alter an image property of an image in response to a user input and a second control adapted to operate in cooperation with the first control to alter the image property in response to a user input. The image property is brightness and the first control alters brightness over a range of image values between two endpoints and the second control defines at least one of the endpoints.

In some embodiments, the first control alters brightness between the two endpoints at least in part by maintaining brightness constant at each endpoint. The image values may be grayscale values or color values. The image editing user interface may include a third control that selects either a minimum image value or a maximum image value to be a first endpoint. The second control may define a second endpoint between the minimum image value and the maximum image value. When the third control is set to select the minimum image value as the first endpoint, brightness between the second endpoint and the maximum image value may be unaffected by the first control. When the third control is set to select the maximum image value as the first endpoint, brightness between the second endpoint and the minimum image value may be unaffected by the first control. The image editing user interface may include a fourth control adapted to apply the user input relating to the first control and the second control to subsequent images in response to a user input. The image editing user interface may include a fifth control adapted to apply the user input relating to the first control and the second control to a range of images in response to a user input.

Other embodiments provide an image editing user interface. The image editing user interface includes a first control adapted to alter an image property in response to a user input and a second control adapted to operate in cooperation with the first control to alter the image property in response to a user input. The image property is contrast. The first control alters contrast in relationship to a point within a range of image values and the second control determines a location of the point.

In some embodiments, the first control creates an S-curve about the point. The S-curve may be inverted. The image values may be grayscale values or color values. The image editing user interface may include a third control adapted to apply the user input relating to the first control and the second control to subsequent images in response to a user input. The image editing user interface may include a fourth control adapted to apply the user input relating to the first control and the second control to a range of images in response to a user input.

Still other embodiments provide a method of editing an image. The method includes, on a display, presenting a user interface to a user. The user interface is adapted to receive user input by way of a first control adapted to alter an image property of an image and a second control adapted to operate in cooperation with the first control to alter the image property. The first control alters brightness over a range of image values between two endpoints and the second control defines at least one of the endpoints. The method also includes receiving a user input by way of the first control and the second control and altering the image property of the image in relationship to the user input. The image values may be grayscale values or color values.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
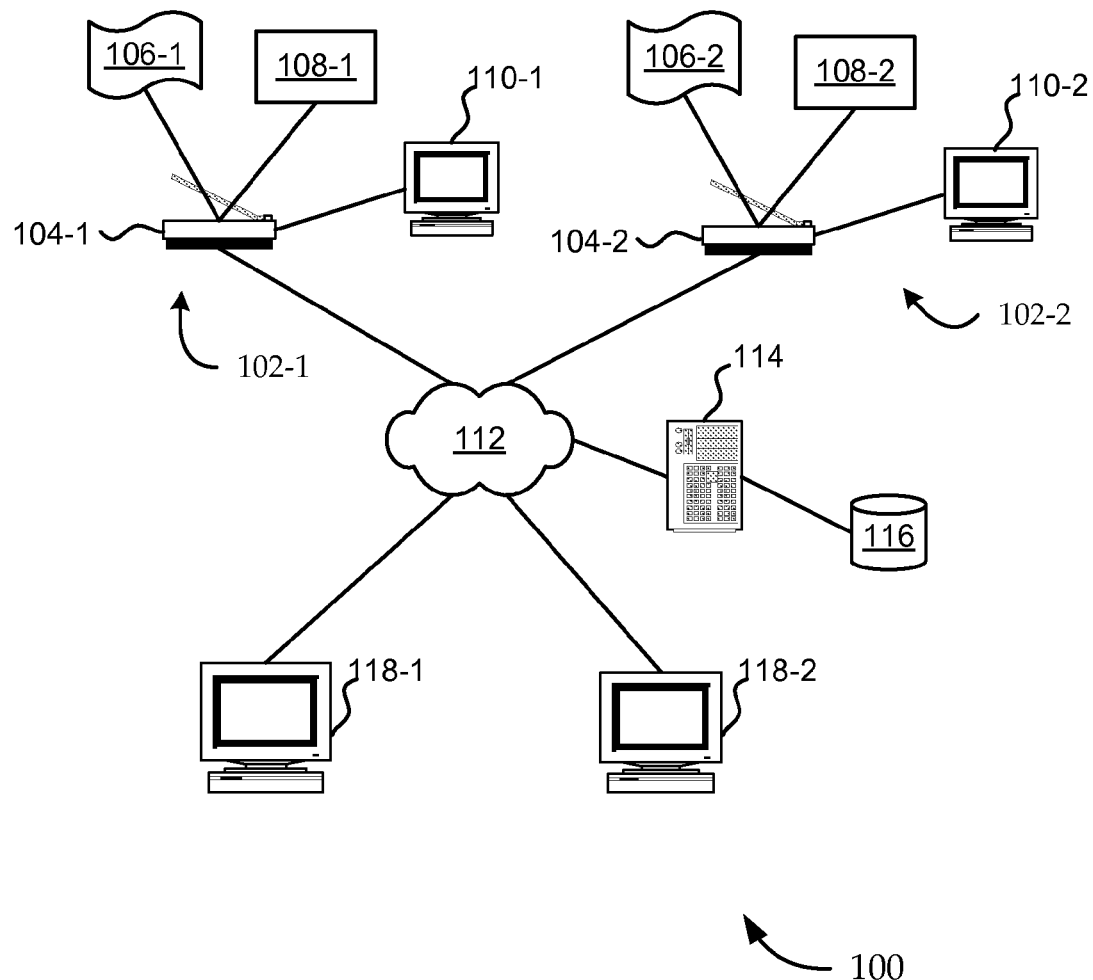
FIG. 1 illustrates an exemplary production scanning system according to embodiments of the invention.

Embodiments of the present invention relate to image editing systems, methods, and user interfaces. In order to provide a context for describing embodiments of the present invention, embodiments of the invention will be described herein with reference to editing images of documents, which may include books, public records, paper documents, microfilm or microfiche documents, and/or the like. Those skilled in the art will appreciate, however, that other embodiments are possible. For example, embodiments of the invention may be used to collect scanned images from other sources.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Embodiments of the present invention relate to altering brightness and/or contrast of images. In order to provide a context for the ensuing description, embodiments of the invention will be discussed in the context of a production scanning system. FIG. 1 depicts an exemplary production scanning system 100 according to embodiments of the invention. Those skilled in the art will appreciate that the system 100 is merely exemplary of a number of possible embodiments. The system 100 includes scanning processes 102 that include scanners 104. The scanning processes may be configured to scan images from microfilm or microfiche 106, paper documents 108, books, public records, historical documents, and/or the like. The scanning processes also include an operator workstation 110, which may be integral with the scanner 104.

Image files comprising scanned images may be sent via a network 112 to a server 114 and stored in a database 116 for further processing or use. The images are thereafter available for post-production processing, which may take place at, for example, post-scanning workstation 118.

The system 100 may be used to process documents as "projects." A project is, for example, a group of source documents to be scanned. Projects may include documents of a common source document type. For example, source document types may be pages of a book, paper documents, microfilm images, microfiche images, and/or the like. Although not essential, it is helpful for a project to include similar documents so that post production may be accomplished for an entire project of similar documents. For example, as will become clear from the ensuing description, a post-production image editor may adjust contrast and/or brightness for an image in a project. If the project comprises images resulting from a common source, the editor may determine that the settings for one image may be applied to the entire project, thereby substantially enhancing the efficiency of the image editing process. Of course, those skilled in the art will appreciate other advantages of the present invention, even if images are not grouped into projects and/or the images do not come from a common source.

Figure 2:
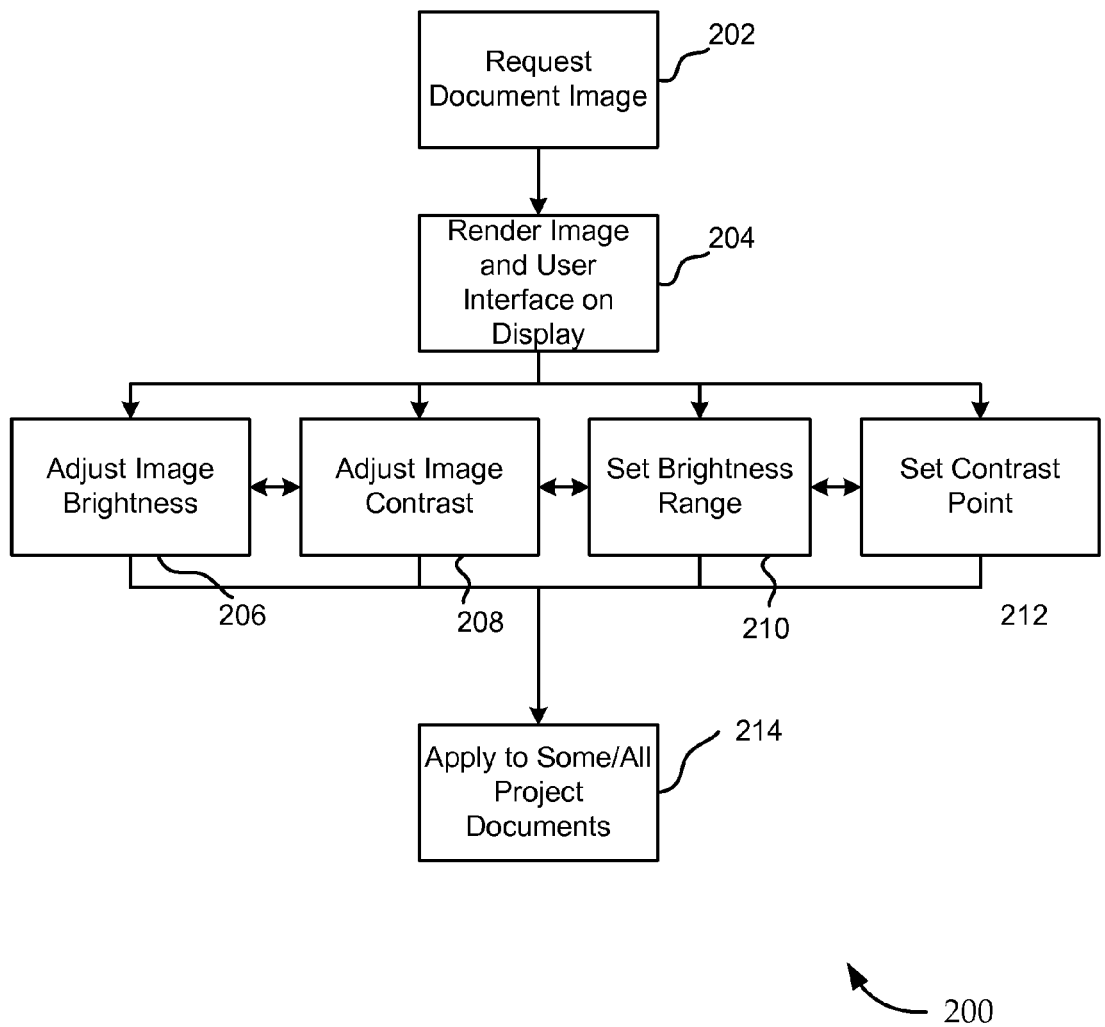
FIG. 2 depicts an exemplary method of editing brightness and contrast of images, which method may be implemented in the system of FIG. 1.

Having described an exemplary system 100 according to embodiments of the invention, attention is directed to FIG. 2, which depicts an exemplary method 200 according to embodiments of the invention. The method may be implemented in the system 100 of FIG. 1 or other appropriate system. Those skilled in the art will appreciate that other exemplary methods may include more, fewer, or different steps than those illustrated and described herein. Further, other exemplary methods may traverse the steps illustrated and described herein in different orders than that shown.

Figure 7:
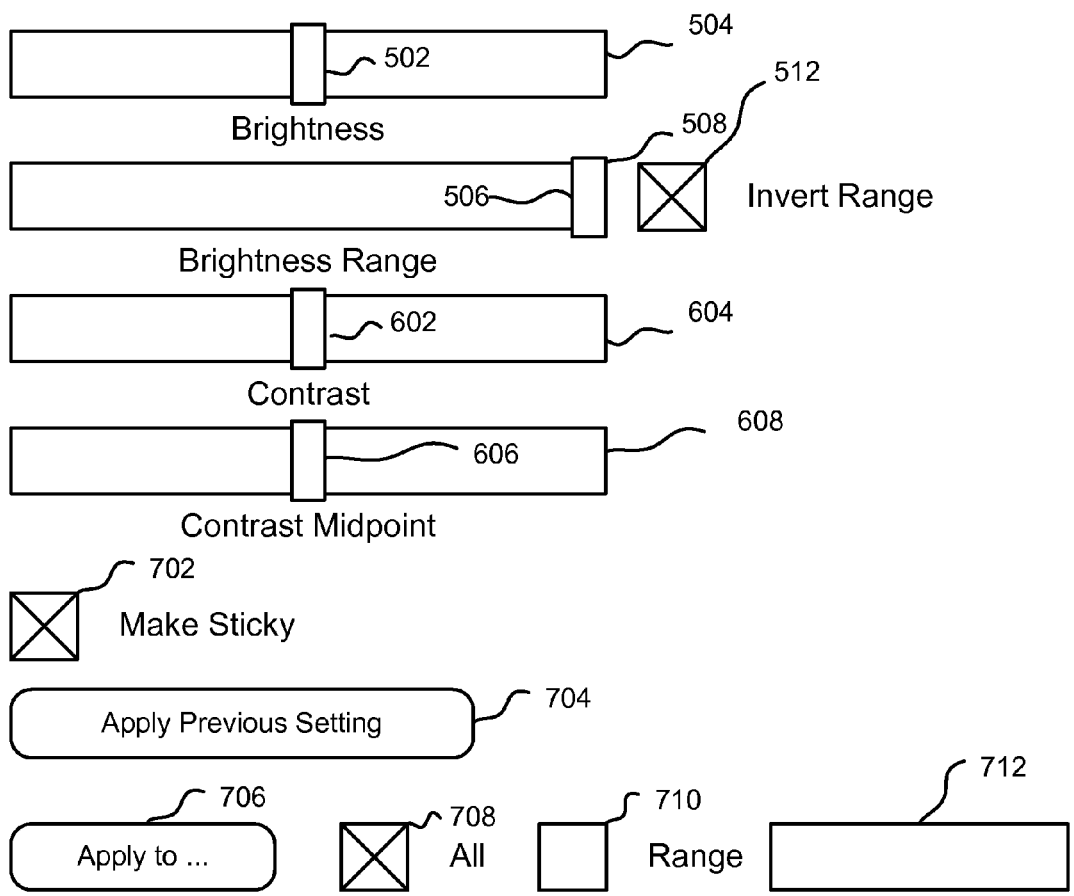
FIG. 7 depicts a brightness and contrast user interface according to embodiments of the invention.

The method 200 relates to editing image brightness and contrast. A user may do so using for example, the post-scanning workstation 118. At block 202 the user may request an image, a project, or several projects from the database 116 for editing. An initial image is then rendered on the user's display. Automatically or upon request (e.g., selecting from a menu), the user may be presented with a software user interface for adjusting brightness and/or contrast. Alternatively, the interface may be implemented in hardware. An exemplary brightness and contrast interface is depicted in FIG. 7 and will be described in greater detail hereinafter. Rendering the image and user interface (if applicable) takes place at block 204. Thereafter, the user may adjust brightness and/or contrast of the image.

Editing image brightness and/or contrast is a common image-editing operation. Brightness and contrast typically go together. Setting the brightness of an image usually equates to translating, or offsetting, the image data. The image data includes an image value for each pixel comprised by the image. If the user adjusts brightness higher, the operation equates to adding a constant positive number to all image values of the image; i.e.,:

new_image_value=image_value+constant.

This has the result of shifting all the grayscale or RGB values to greater intensity values, resulting in a brighter image. Similarly, if the user adjusts the image brightness lower, the operation equates to subtracting a constant positive number from all the values of the image, thus shifting all the values to lower intensity values, resulting in a darker image.

Because there is a limited range of image values (e.g. 0-255), part of the brightness operation includes clipping (sometimes called saturating) the values at the endpoints of the range. In other words, if a new image value is greater than the maximum of the range (e.g. >255) or if a new image value is less than the minimum of the range (e.g. <0), then the image value is set to the maximum or minimum value, respectively. For example, if the image values range from 0 to 255 and the brightness constant is 30, then any previous image values from 225 through 255 will all be set to 255. That means that all the differences in image values from 225 through 255 are lost and become the same value.

Figure 3A:
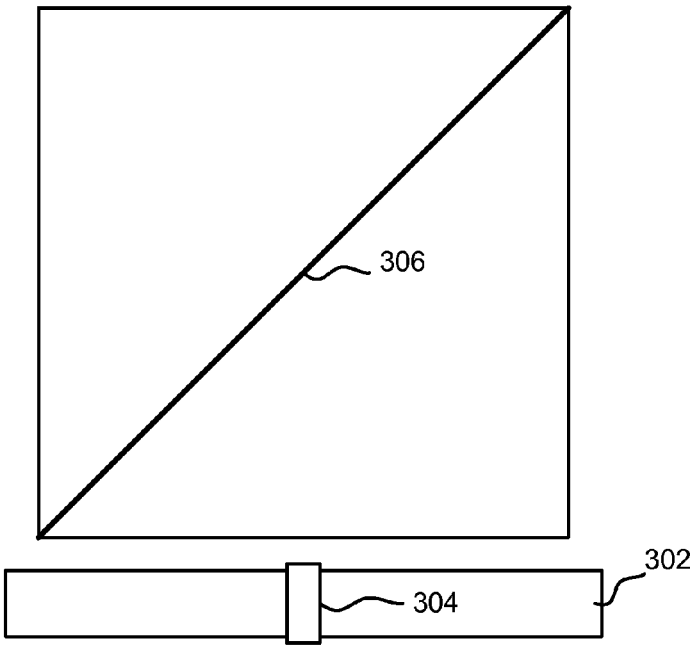
FIGS. 3A-3C depict a brightness control and its corresponding effect of image values.
Figure 3B:
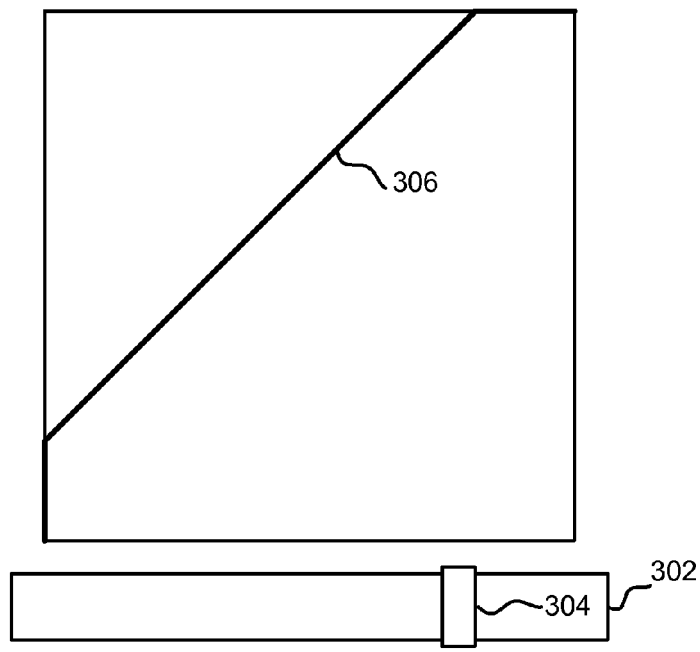
Figure 3C:
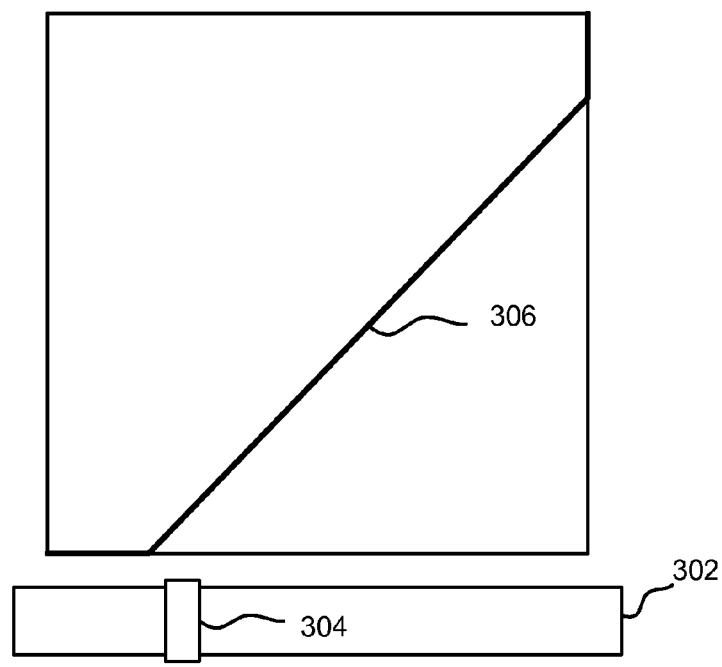

FIGS. 3A-3C illustrate this point by depicting a typical brightness control 302 and a graphical depiction of how it alters image values. In response to a user input using a slider 304, image brightness values change as depicted by the intensity curve 306. FIG. 3A depicts a neutral brightness position in which image output values equal image input values for all image values. In FIG. 3B, image values have been increased by a constant value. As a result, image values at the top of the range (highlights) become indistinguishable from one another over some range. In FIG. 3C, image values have been decreased by a constant value. As a result, image values at the bottom of the range (shadows) become indistinguishable from one another.

Figure 4A:
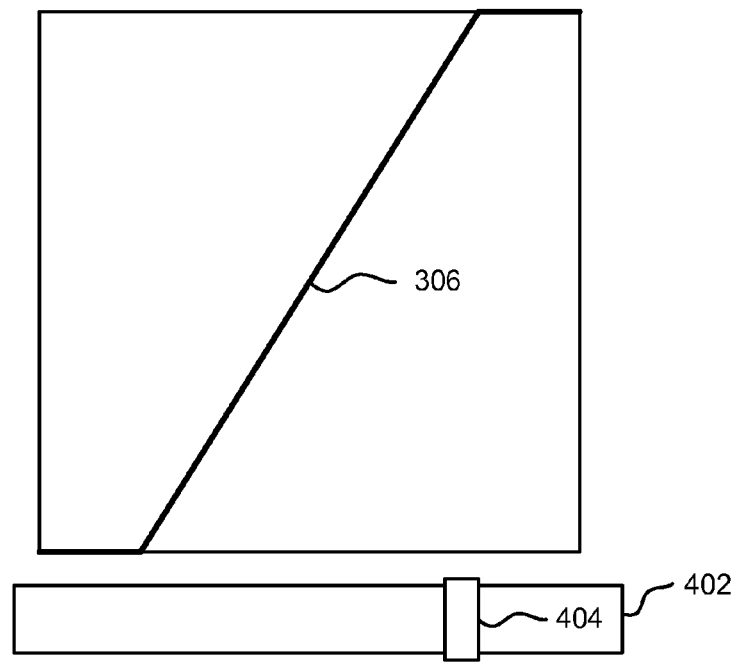
FIGS. 4A and 4B depict a contrast control and its corresponding effect on image values.
Figure 4B:
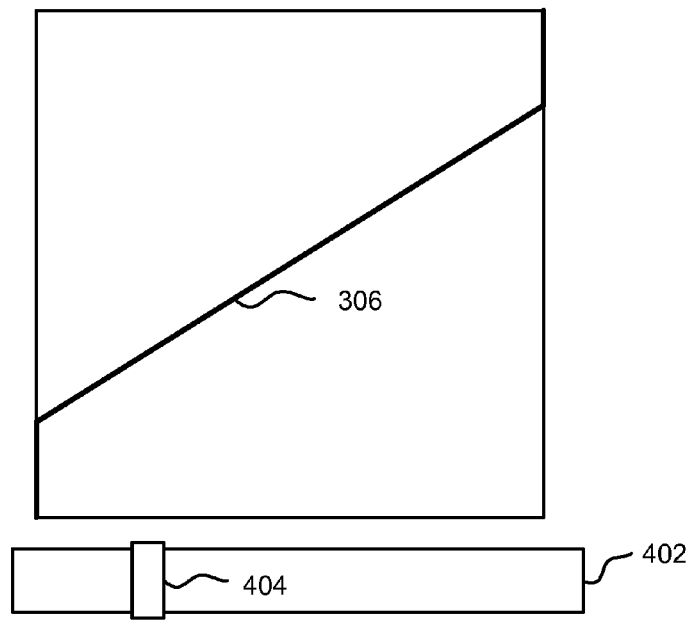

While changing brightness entails offsetting the values of an image, changing contrast entails applying a linear scale factor over the image values. If the scale factor is increased (e.g., above 1), the values are spread out further, thereby increasing the contrast. This situation is depicted in FIG. 4A, in which a typical contrast control 402 is used to increase the image contrast using the slider 404. If, on the other hand, the scale factor is lowered (e.g., less than one), the values are compressed, decreasing the contrast as depicted in FIG. 4B.

Contrast scaling is done about a point. By default, the point is the mid-point image value, but changing the brightness effectively shifts the point. As contrast is reduced to the minimum setting, output image values get closer to the image value at the point. As the contrast is increased to its maximum setting, output image values get further spread out from each other and from the point.

As with brightness, contrast is limited by the range of image values so that as contrast increases, new image values must be clipped to the bounding values of the range. Thus, when contrast is increased for mid-tones of an image, contrast will be decreased for highlights and shadows of the image, since they will be clipped to the max and min values of the range.

When decreasing contrast, the operation is further limited because image values typically map to a discreet set of whole numbers. So as contrast is decreased, two image values that were different before become only fractionally different and thus map to the same whole number image value. Decreasing contrast has the further disadvantage that the upper and lower portions of the range of image values are effectively no longer used.

Thus it can be stated that typical brightness and contrast operations result in a degradation in image quality in the sense that they reduce the effective dynamic range of the image. In other words, where there were, for example, 256 possible image values before, the contrast and/or brightness operations result in an image with a smaller set of resulting image values.

When digitizing historical documents, it is often desirable to adjust brightness and/or contrast. Over time, historical documents may become faded, they may become darkened, they may lose contrast when microfilmed, and/or the like. Many historical documents contain hand-written or machine-printed text that has become partially faded so that portions of the text are difficult to distinguish from the background of the image. Because of this characteristic, typical brightness and contrast operations may make some of the text more readable, while losing all contrast between the light strokes and the background.

Because of these and other considerations, it is highly desirable to apply brightness and contrast operations that lose as little dynamic range as possible so that the document can be made more readable without completely losing the lighter strokes on a light background or the darker strokes on a dark background. Unfortunately, complex editing programs that attempt to address these shortcomings are difficult to use. Slight variations adjustments using such programs can produce significant changes to the image, many of which are undesirable. Such tools require significant training and understanding of image processing to use, making them infeasible for use by an unskilled work force. Such tools are somewhat time-consuming to use, making them unfit for an environment where many images must be edited quickly.

FIG. 5A-5F depict a brightness control 504 according to embodiments of the present invention and its corresponding effect on image values. The brightness tool addresses a number of shortcomings found in previously-known tools. The new brightness control may be implemented as a slider 502. While provided herein for depicting the control's effect on brightness, the graphical depiction is not necessarily included as part of the user interface. As the slider is moved to the right, brightness increases; as it moves to the left, brightness decreases; and when the slider is in the neutral position (the middle of the control), there is no effect on brightness. Instead of using the slider input as a constant value to translate the image values, however, the slider input is used to construct a brightness curve that keeps the end-point image values anchored at the min and max range values. The greater the movement of the slider, the greater the amplitude of the curve. When the slider moves past to the left of a neutral point, the curve is inverted from a brightness curve to a darkness curve, or vice versa. This adjusts image brightness with minimal loss of dynamic range. The only loss occurs because of the mapping to a set of discreet whole number values. In some embodiments, no loss occurs due to clipping. Adjusting brightness in this manner is shown as block 206 of FIG. 2.

An optional second control 508, such as a second slider 506, may be provided that specifies which portion of the range of image values is affected by the curve. For example, a user could choose to apply a brightening curve to only the upper portion of the range, thus brightening only the upper mid-tones and highlights of the image. Or a user could choose to apply the brightening to only the lower mid-tones and shadows of the image, while leaving the other values unchanged. These controls and their corresponding effects on image values are discussed in greater detail immediately hereinafter. Adjusting brightness range is depicted as block 210 of FIG. 2.

Figure 5A:
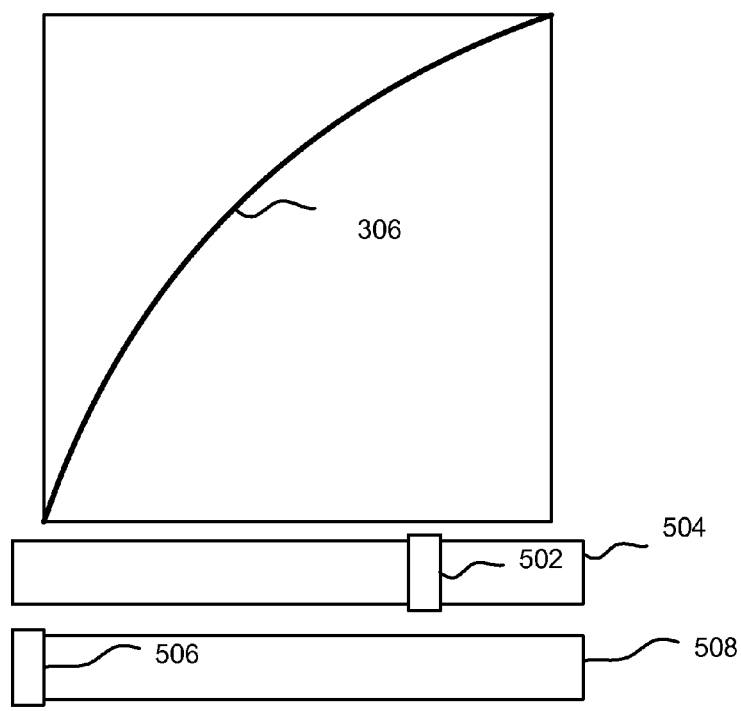
FIGS. 5A-5F depict a user interface for editing brightness according to embodiments of the present invention and its corresponding effect on image values.

FIG. 5A depicts an example of increasing the brightness of an image. The slider 502 of a first control 504 is used to increase brightness. As depicted by the graph 306 of input image values to output image values, this produces a hill-shaped mapping curve. While this brightness adjustment increases contrast in the lower mid-tones and shadows, it lowers contrast in the upper mid-tones and highlights, effectively brightening the image.

Figure 5B:
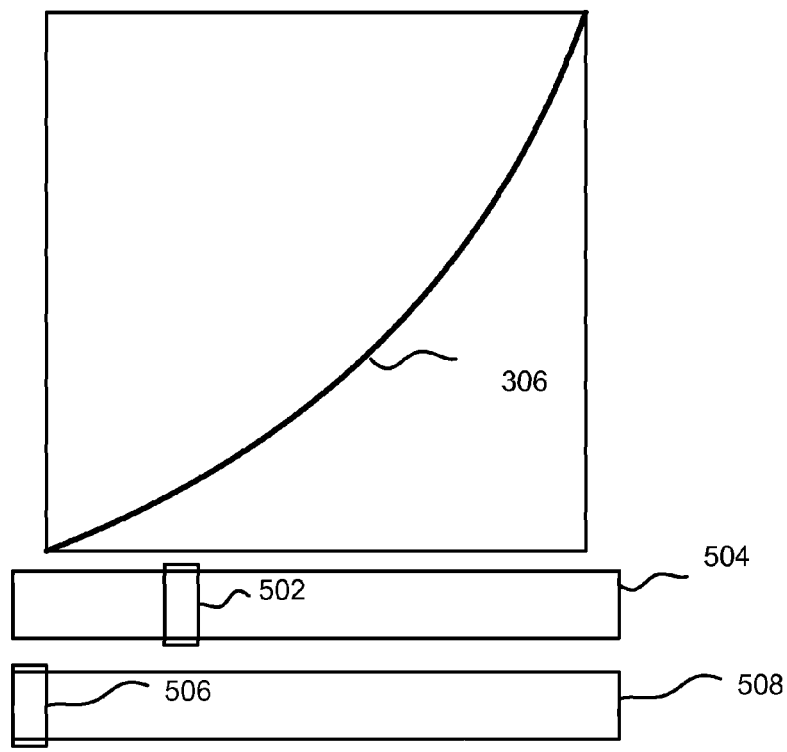

FIG. 5B depicts a situation in which the first brightness control 504 is used to decrease brightness in the image. In doing so, it increases contrast in the upper mid-tone values and highlights, while lowering contrast in the lower mid-tone values and shadows, effectively darkening the image.

Figure 5C:
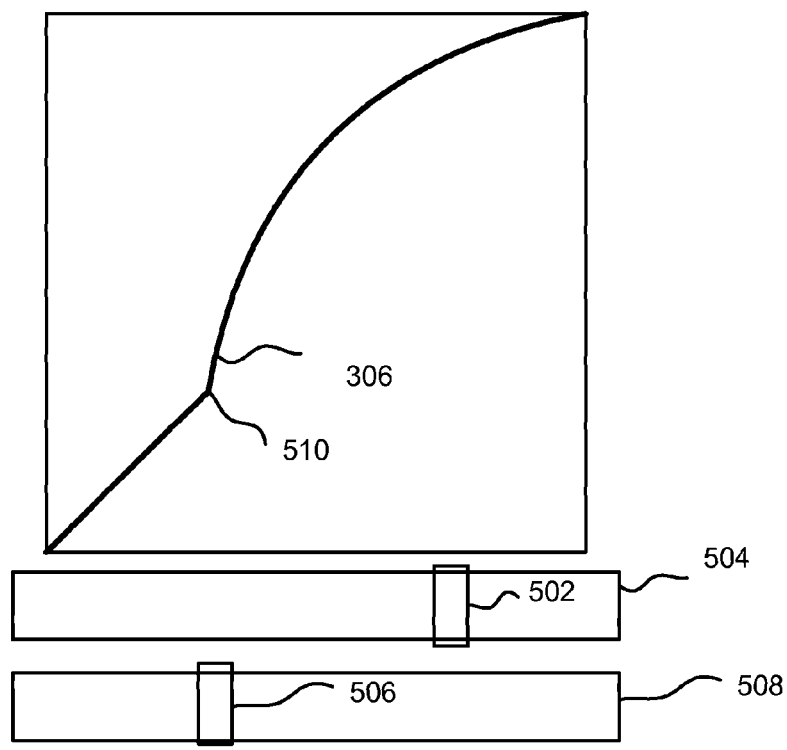
Figure 5D:
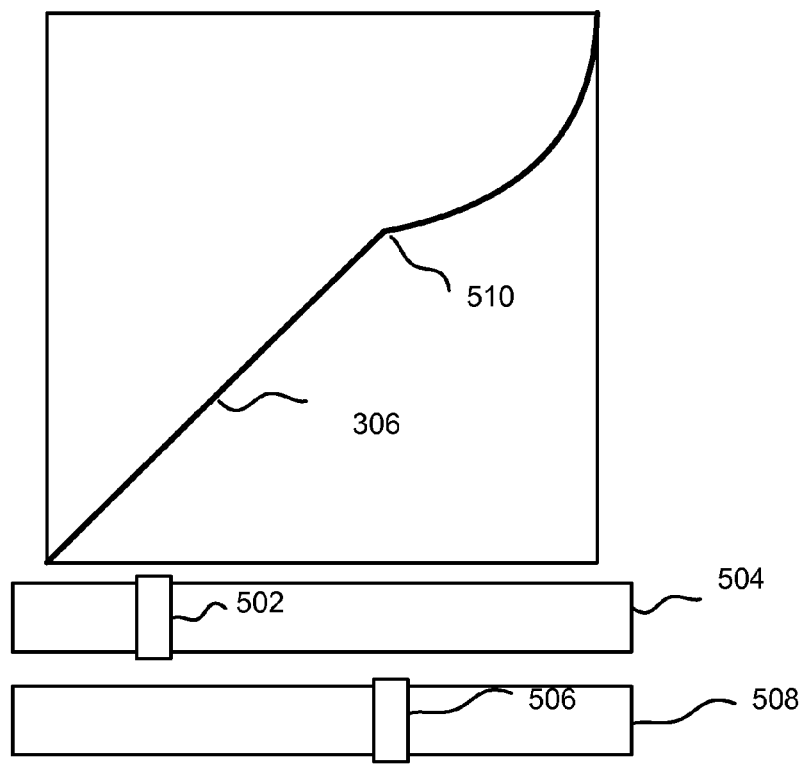

In FIG. 5C, the slider 506 of the second control is used to maintain a neutral image brightness between the minimum image value and a point 510 determined by the slider 506. Above the point 510, however, the slider 502 of the first control 504 controls brightness. It can be a brightness curve, as depicted in FIG. 5C, or an inverted, darkness curve, as depicted in FIG. 5D.

Figure 5E:
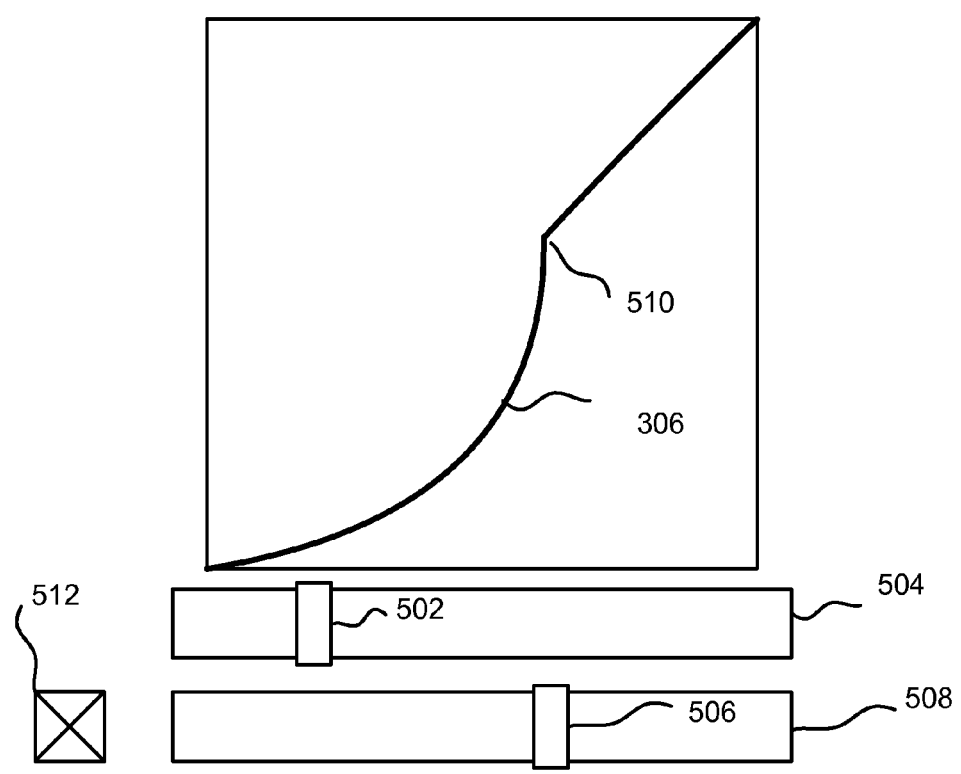
Figure 5F:
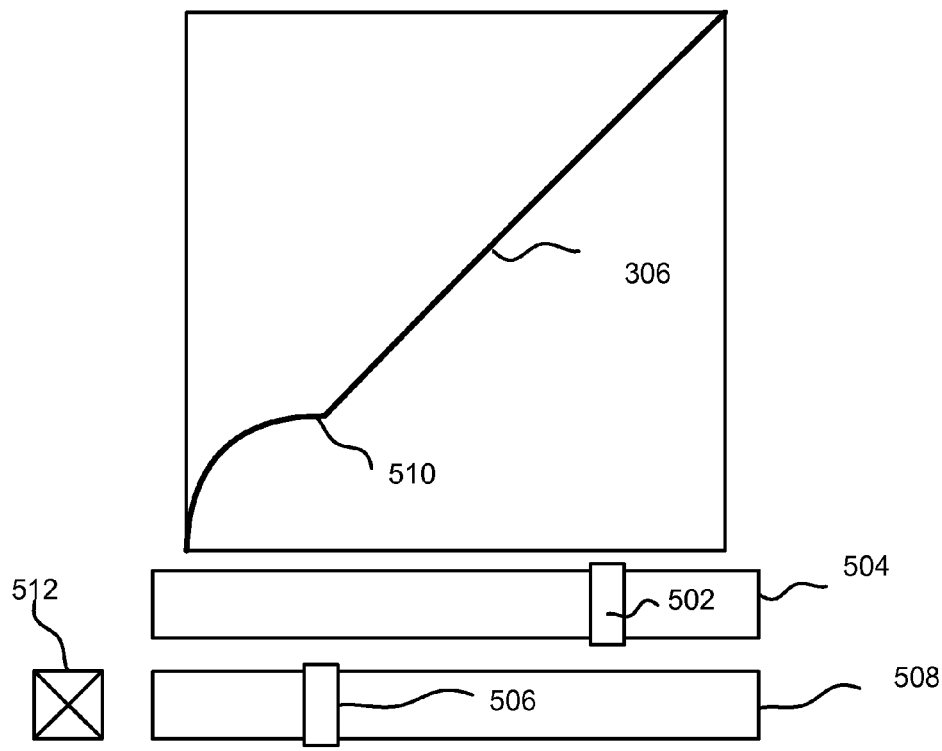

FIGS. 5E and 5F depict an additional embodiment that includes a third control 512. The third control determines which range of image values are affected by the first 504 and second controls 508. A default (unselected) third control 512 could operate as depicted in FIGS. 5C and 5D, wherein the first control 504 affects the brightness of the upper image values and the second control 508 determines the range of upper image values affected. When the third control is selected, however, the first control 504 affects the brightness of the lower image values, and the second control determines the range of lower image values affected. These are, of course, exemplary embodiments.

Figure 6A:
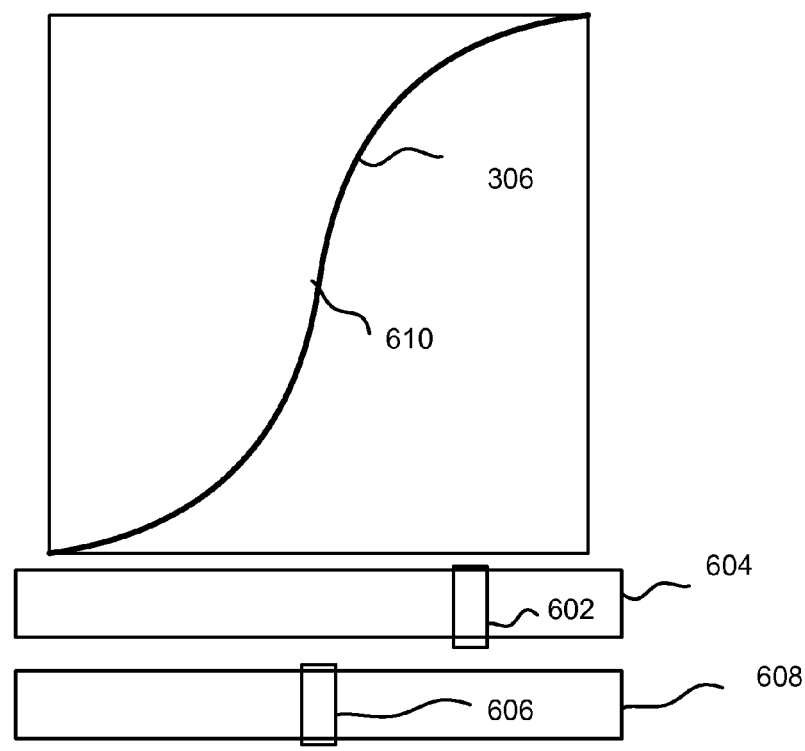
FIGS. 6A-6C depict a user interface for editing contrast according to embodiments of the present invention and its corresponding effect on image values.
Figure 6B:
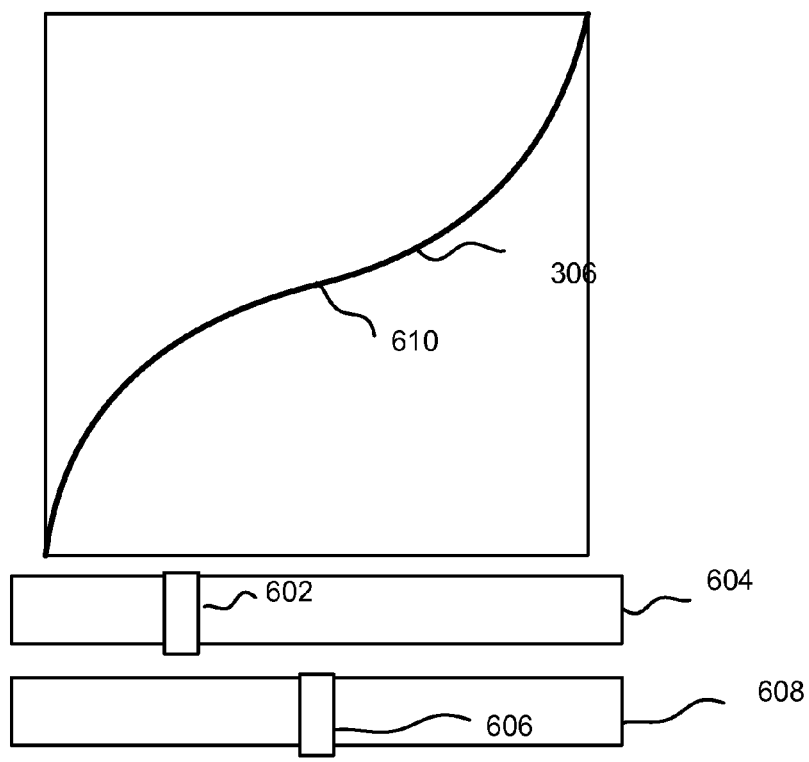
Figure 6C:
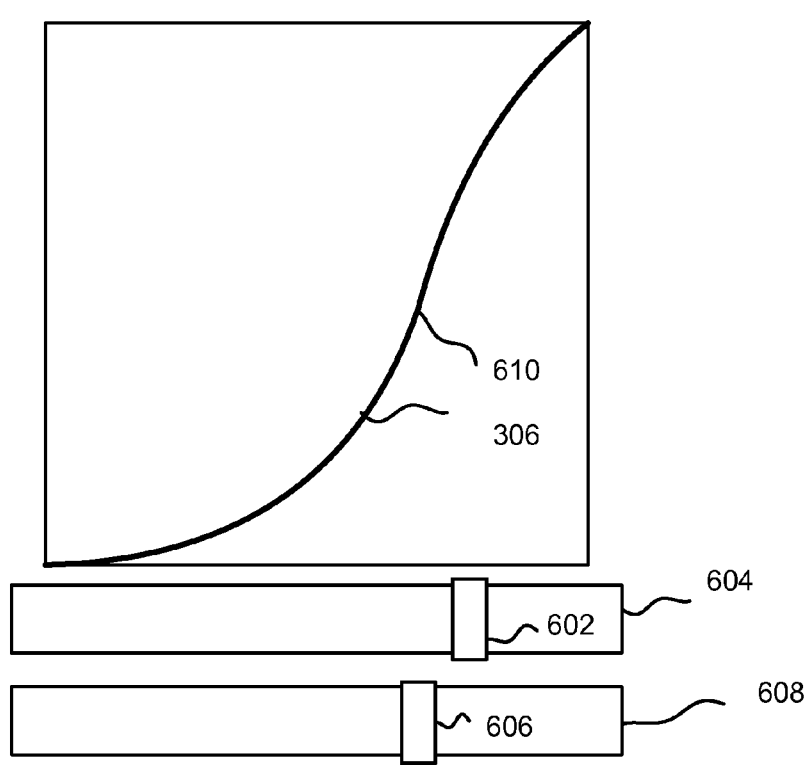

FIGS. 6A-6C depict contrast controls 604, 608 according to embodiments of the invention, and their corresponding effect on image values. The slider 602 of the first contrast control 604 varies contrast about a point 610. When the slider is moved to the right, contrast increases about the point while maintaining the endpoints "locked." This creates an "S" curve wherein contrast of the mid-tone values increases, while contrast of the shadows and highlights decreases, thus increasing the apparent contrast of the image. This is depicted in FIG. 6A. An inverted "S" curve, as depicted in FIG. 6B, increases contrast in the shadows and highlights regions, while lowering contrast in the mid-tone region, thus decreasing the apparent contrast of the image. This adjustment of contrast is depicted as block 208 of FIG. 2.

As depicted in FIG. 6C, the position of the slider 606 of the second contrast control 608 determines the location of the point 610 about which contrast in changed by the first contrast control 604. This is depicted as block 212 of FIG. 2.

It is desirable to make scanning and processing documents as efficient as possible to thereby reduce cost. Two additional methods for increasing the productivity of editing brightness and contrast and to images are based on the assumption that many images (such as those on the same roll of microfilm) are likely to require the same or very similar contrast and brightness adjustments. These are explained in greater detail with respect to FIG. 7.

FIG. 7 depicts a brightness and contrast user interface according to embodiments of the invention. It includes the brightness and contrast controls discussed previously, labeled to aid users. The interface of FIG. 7 could be implemented in software or hardware. In addition to the brightness and contrast controls discussed thus far, the user interface of FIG. 7 includes additional controls that allow a user to selective apply setting to additional images. The first of these is the "make sticky" selection 702. When selected, the current brightness and contrast settings are applied upon opening a subsequent image. This is useful in cases in which subsequent images derive from the same source as the current image. Another control is the "apply previous settings" button 704. This button would typically be deactivated when the "make sticky" selection 702 is selected. Upon opening an image, neutral contrast and brightness settings are applied. The user may select the "apply previous settings" button 704, however, to apply the immediately previous settings to the current image. In both of the foregoing cases, the user could adjust the settings after having the previous settings applied to the current image.

The user interface also includes controls that allow current settings to be applied to an entire project, all open images, a range of images, or the like. The "apply to . . . " button 706 applies current settings to all images, if the "all" selection 708 is checked, or applies the current settings to a range of settings of the "range" selection 710 is selected and the range box 712 specifies the range. Of course, these types of productivity enhancing features could be applied to other imaging-editing operations as well.

Having described several embodiments, it will be recognized by those of skill in the art that various modifications, alternative constructions, and equivalents may be used without departing from the spirit and scope of the invention. For example, embodiments of the present invention have been described with respect to production scanning systems. In other embodiments, however, the teachings herein may be used to enable text (or other content on an image) to be more discernable for a temporary amount of time (e.g. while trying to "read" the content on the image), and the adjustments may or may not be saved back to the image file. The adjustments are only temporary to enable better reading of the content. This applies, for example, to those who may be working to index (key from image) portions of a document that have been scanned into an image. Additionally, a number of well known processes and elements have not been described in order to avoid unnecessarily obscuring the present invention. Accordingly, the above description should not be taken as limiting the scope of the invention, which is defined in the following claims.

What is claimed is:

1. An image editing user interface, comprising:
   a first control adapted to alter the brightness of an image over a range of image values between two endpoints by modifying a brightness curve in response to a position of a first slider button within a first slider bar; wherein:
   the first slider bar comprises a neutral position, a first range positioned on one side of the neutral position, and a second range positioned on an opposite side of the neutral position;
   positioning the first slider button in the neutral position has no effect on the brightness curve and the brightness of the image;
   sliding the first slider button within the first range produces a non-linear brightness curve that increases the brightness of the image, wherein an amplitude of the brightness curve increases as the first slider button is slid away from the neutral position; and
   sliding the first slider button within the second range inverts the brightness curve to produce a non-linear darkness curve, wherein the darkness curve decreases the brightness of the image, and wherein an amplitude of the darkness curve increases as the first slider button is slid away from the neutral position; and a second control adapted to operate in cooperation with the first control to modify the brightness curve in response to a position of a second slider button within a second slider bar, wherein:

the position of the second slider button within the second slider bar defines a third point along the brightness curve such that a first portion of the brightness curve positioned on one side of the third point is adjustable as the first slider button is slid within the first slider bar to produce the non-linear brightness curve or non-linear darkness curve while a second portion of the brightness curve positioned on the opposite side of the third point is unaffected as the first slider button is slid within the first slider bar.

2. The image editing user interface of claim 1, wherein the first control alters brightness between the two endpoints at least in part by maintaining brightness constant at each endpoint.

3. The image editing user interface of claim 1, wherein the image values comprise grayscale values.

4. The image editing user interface of claim 1, wherein the image values comprise color values.

5. The image editing user interface of claim 1, further comprising a third control configured to switch the portion of the brightness curve that is adjustable so that the second portion of the brightness curve is adjustable as the first slider button is slid within the first slider bar to produce the non-linear brightness curve or non-linear darkness curve while the first portion of the brightness curve is unaffected as the first slider button is slid within the first slider bar.

6. The image editing user interface of claim 1, wherein the third point corresponds to a minimum image value of the range of image values such that no portion of the brightness curve or darkness curve is adjusted.

7. The image editing user interface of claim 5, further comprising a fourth control adapted to apply the brightness settings relating to the first control and the second control to subsequent images in response to a user input.

8. The image editing user interface of claim 7, further comprising a fifth control adapted to apply the brightness settings relating to the first control and the second control to a range of images in response to a user input.

9. An image editing user interface, comprising:

a first control adapted to alter the contrast of an image in relation to a point representing an image value within a range of image values in response to a position of a first slider button within a first slider bar wherein:

sliding the first slider button within a first range of the first slider bar produces a first contrast curve that increases the contrast of image values near the point and decreases the contrast of image values away from the point, the first range being positioned on one side of the point and the contrast increasing about the point as the first slider button is slid away from the point;

sliding the first slider button within a second range of the first slider bar produces a second contrast curve that increases the contrast of image values away from the point and decreases the contrast of image values near the point, the second range being positioned on the opposite side of the point; and a second control adapted to operate in cooperation with the first control to alter the contrast of the image in response to a position of a second slider button within a second slider bar, wherein the position of the second slider button within the second slider bar defines the location of the point within the range of image values and defines the first range and the second range.

10. The image editing user interface of claim 9, wherein the first control creates an S-curve about the point.

11. The image editing user interface of claim 10, wherein the S-curve is inverted.

12. The image editing user interface of claim 9, wherein the image values comprise grayscale values.

13. The image editing user interface of claim 9, wherein the image values comprise color values.

14. The image editing user interface of claim 9, further comprising a third control adapted to apply the contrast settings relating to the first control and the second control to subsequent images in response to a user input.

15. The image editing user interface of claim 9, further comprising a fourth control adapted to apply the contrast settings relating to the first control and the second control to a range of images in response to a user input.

16. A method of editing an image, comprising:

on a display, presenting a user interface to a user, wherein the user interface is adapted to receive user input by way of a first control adapted to alter brightness of an image over a range of image values between two endpoints by modifying a brightness curve in response to a position of a first slider button within a first slider bar and a second control adapted to operate in cooperation with the first control to modify the brightness curve in response to a position of a second slider button within a second slider bar, wherein:

the first slider bar comprises a neutral position, a first range positioned on one side of the neutral position, and a second range positioned on an opposite side of the neutral position;

positioning the first slider button in the neutral position has no effect on the brightness curve and the brightness of the image;

sliding the first slider button within the first range produces a non-linear brightness curve that increases the brightness of the image, wherein an amplitude of the brightness curve increases as the first slider button is slid away from the neutral position;

sliding the first slider button within the second range inverts the brightness curve to produce a non-linear darkness curve, wherein the darkness curve decreases the brightness of the image, and wherein an amplitude of the darkness curve increases as the first slider button is slid away from the neutral position;

the position of the second slider button within the second slider bar defines a third point along the brightness curve such that a first portion of the brightness curve positioned on one side of the third point is adjustable as the first slider button is slid within the first slider bar to produce the non-linear brightness curve or non-linear darkness curve while a second portion of the brightness curve positioned on the opposite side of the third point is unaffected as the first slider button is slid within the first slider bar;

receiving a user input by way of the first control and the second control; and altering the brightness of the image in relationship to the user input.

17. The method of claim 16, wherein the image values comprise grayscale values.

18. The method of claim 16, wherein the image values comprise color values.

* * * * *